US012568340B2

(12) United States Patent
Hansen

(10) Patent No.: US 12,568,340 B2
(45) Date of Patent: Mar. 3, 2026

(54) EAR MODEL UNIT FOR ELECTROACOUSTIC TESTING AND A METHOD FOR PERFORMING ELECTROACOUSTIC TESTING OF A HEARING DEVICE

(71) Applicant: GN AUDIO A/S, Ballerup (DK)

(72) Inventor: Helge Lykke Hansen, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 169 days.

(21) Appl. No.: 18/696,109

(22) PCT Filed: Oct. 8, 2021

(86) PCT No.: PCT/EP2021/077867
§ 371 (c)(1),
(2) Date: Mar. 27, 2024

(87) PCT Pub. No.: WO2023/057073
PCT Pub. Date: Apr. 13, 2023

(65) Prior Publication Data

US 2024/0388859 A1 Nov. 21, 2024

(51) Int. Cl.
*H04R 29/00* (2006.01)
*H04R 1/08* (2006.01)

(52) U.S. Cl.
CPC ............. *H04R 29/001* (2013.01); *H04R 1/08* (2013.01)

(58) Field of Classification Search
CPC ......... H04R 1/08; H04R 29/001; H04R 5/027
USPC ...................................... 381/56–59, 60, 312
See application file for complete search history.

(56) References Cited

U.S. PATENT DOCUMENTS

| | | | | |
|---|---|---|---|---|
| 10,237,667 B2 * | 3/2019 | Inagaki | G01H 3/00 | |
| 11,722,812 B2 * | 8/2023 | Schmidt | H04R 1/1083 | 381/309 |
| 2015/0289053 A1 * | 10/2015 | Inagaki | G01H 17/00 | 381/151 |
| 2016/0134977 A1 * | 5/2016 | Inagaki | H04R 25/606 | 381/60 |
| 2016/0261964 A1 * | 9/2016 | Ikeda | H04R 29/00 | |
| 2019/0261078 A1 * | 8/2019 | Ouchi | H04R 1/1016 | |

FOREIGN PATENT DOCUMENTS

EP 3007466 A1 4/2016

OTHER PUBLICATIONS

International Search Report and Written Opinion issued in PCT/EP2021/077867, dated Jun. 28, 2022, 14 pages provided.

(Continued)

*Primary Examiner* — Lun-See Lao
(74) *Attorney, Agent, or Firm* — HSML P.C.

(57) ABSTRACT

The present invention relates to an ear model unit for electroacoustic testing. The ear model unit is configured to be connected to an electrodynamic vibrator. The ear model unit comprises an elastomer part formed from an elastomer and a rigid element connected to the elastomer part. The rigid element comprises means for connecting to the electrodynamic vibrator and it is configured to cause vibration of the elastomer part upon being excited by the electrodynamic vibrator. Also described and recited are an apparatus and a method for performing the electroacoustic testing.

15 Claims, 4 Drawing Sheets a)

b)

(56) References Cited

OTHER PUBLICATIONS

Figure 1:
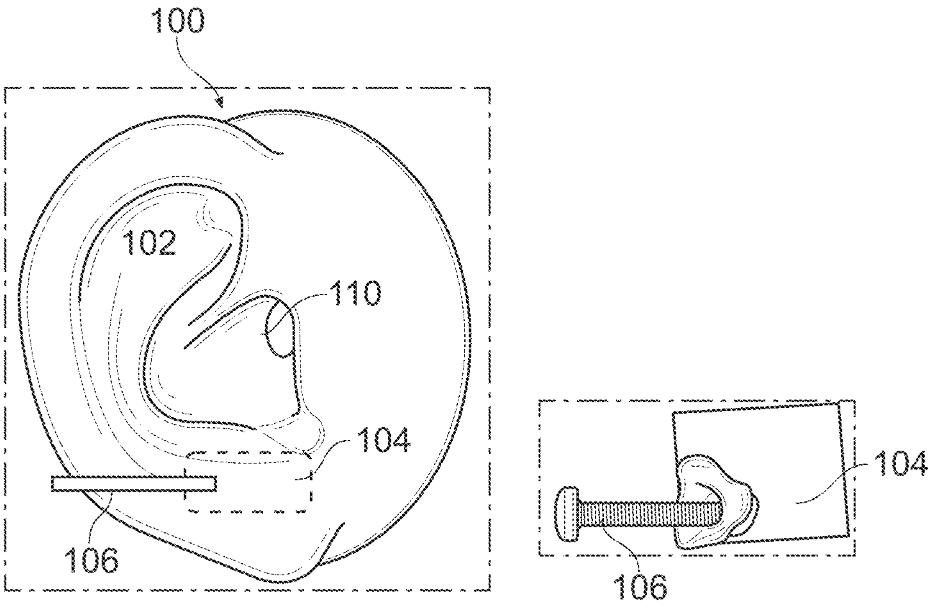
Figure 1:
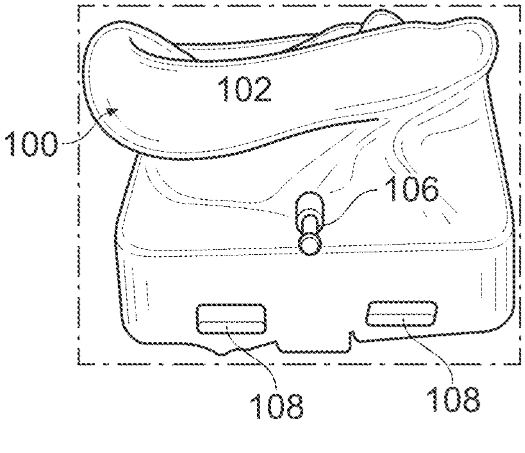
Figure 1:
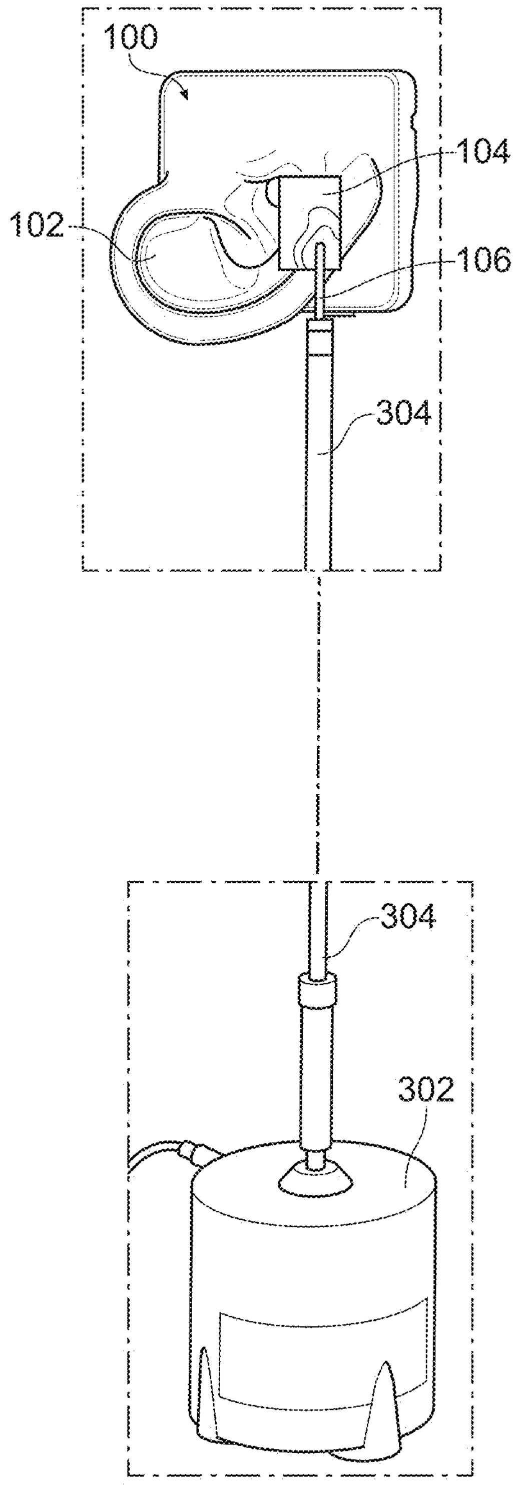

Reinfeldt Sabine et al, “Examination of bone-conducted transmission from sound field excitation measured by thresholds, ear-canal sound pressure, and skull vibrations”, The Journal of the Acoustical Society of America, American Institute of Physics, 2 Huntington Quadrangle, Melville, NY 11747, vol. {0} 121, No. {0} 3, May 8, 2007 (May 8, 2007), pp. 1576-1587, XP012096478.

* cited by examiner a)

b)

c)

a)

b)

a)

b)

EAR MODEL UNIT FOR ELECTROACOUSTIC TESTING AND A METHOD FOR PERFORMING ELECTROACOUSTIC TESTING OF A HEARING DEVICE

FIELD OF THE INVENTION

The present disclosure relates to an ear model unit for electroacoustic testing, an apparatus for electroacoustic testing and a method for performing electroacoustic testing of a hearing device.

BACKGROUND

For the purpose of electroacoustic tests of electronic devices such as telephone handsets, headsets, headphones, earphones, audio conference devices, hearing instruments, hearing protectors etc., specialized manikins with a built-in ear simulator and mouth simulators exist.

The specialized manikins provide a more realistic reproduction of the acoustic properties of, typically, an average adult human head; sometimes including a torso. As an example, Head and Torso Simulator (HATS) Type 4128C, manufactured by Brüel & Kjær, is a manikin with built-in ear and mouth simulators to provide a realistic reproduction of the acoustic properties of an average adult human head and torso. It is designed to be used in-situ electroacoustic tests on, for example, telephone handsets, headsets, audio conference devices, microphones, headphones, hearing aids and hearing protectors.

However, it has been observed that the realistic reproduction of the acoustic properties can be further improved for the benefit of, e.g., improving electronic devices including the above-mentioned electronic devices. In particular, a more realistic and precise reproduction of the acoustic properties can be achieved. Also, power consumption and annoying noise during the electroacoustic tests can be reduced.

It is realized that the prior art manikins for electroacoustic tests, and in particular a mouth simulator in the manikin, is not suited to generate a sufficient vibration amplitude at the ear portion of the manikin.

SUMMARY

It is an object of the present disclosure to mitigate, alleviate or eliminate one or more of the above-identified deficiencies and disadvantages in the prior art and solve at least the above mentioned problem.

In particular, it is an object of the embodiments of the present invention to provide a separate ear unit that can be arranged at a manikin and which can be individually vibrated, resulting in a decreased power consumption and noise generation of an electroacoustic test.

It is a further object of the embodiments of the present invention to provide an ear unit which can be vibrated by an electrodynamic vibrator arranged at a distance from a manikin, resulting in a more realistic and precise reproduction of the acoustic properties of the manikin.

According to a first aspect, an ear model unit for electroacoustic testing is provided. The ear model unit is configured to be connected to an electrodynamic vibrator. The ear model unit comprises an elastomer part formed from an elastomer. The ear model unit further comprises a rigid element connected to the elastomer part. The rigid element comprises means for connecting to the electrodynamic vibrator. The rigid element is configured to cause vibration of the elastomer part upon the rigid element being excited by the electrodynamic vibrator.

The ear model unit may be suitable for electroacoustic testing of a hearing device. The hearing device under test may include telephone handsets, headsets, headphones, earphones, hearing instruments, hearing protectors, and in particular on-ear hearing devices, and in-the-ear hearing devices. The ear model unit may have a size of an average human ear and may at least define an outer ear and ear canal. The ear model unit closely resembles a human ear and loads sounds presented to it in a similar way as the human ear. The shape of the ear model unit is formed to closely mimic the shape of a real human ear and its properties. The ear canal may be an integral part of the ear model unit.

The electrodynamic vibrator is a device that converts electrical energy from a power amplifier to mechanical vibrations using the principles of electromagnetism. The connection between the ear model unit and the electrodynamic vibrator may be established via a vibrating rod having, e.g., a permanent magnet at one end connected to the rigid element of the ear model unit comprising a metal portion, or by glue. The electrodynamic vibrator and the vibrating rod may interact electromagnetically to produce a force which induces a vibration at the ear model unit, viz. the vibrating rod transfers vibration to the ear model unit. The electrodynamic vibrator may be a loudspeaker. In that case, the vibrations are controlled in accordance with an electric signal applied to the loudspeaker to cause an alternating current in the loudspeaker.

The elastomer part is formed from an elastomer such as silicone, rubber, or other soft and flexible material which can closely mimic properties of a human ear. The elastomer part can be molded such that it takes a general shape of a human ear and comprises all features that exist in the human ear, e.g. helix, antihelix, pinna, concha, etc. The elastomer part displays rubber-like elasticity and it may be configured to bend in the same way as the human ear.

Apart for the elastomer part, the ear model unit comprises the rigid element. In contrast to the elastomer part, the rigid element is unable to bend when a force is applied to the ear model unit or to the rigid element directly. Also, the rigid element may not bend when vibrations are applied to it or to the ear model unit. Young modulus of the rigid element may be at least 20 GPa, such as at least 50 GPa, such as more than 150 GPa, such as in the range between 180 and 200 GPa or higher. The rigid element may be significantly smaller than the elastomer part, such as at least ten times smaller than the elastomer part.

The rigid element is connected to the elastomer part. The rigid element may be placed completely or partially inside the elastomer part, i.e. the elastomer part may be arranged to conceal the rigid element. The rigid element may be pressed onto or into the elastomer part of the ear model unit, i.e. onto its surface. The rigid element may be placed at various parts of the ear model unit so that it can cause vibrations of the ear unit. For instance, the rigid element may be placed inside the ear canal of the ear model unit, such as close to the ear canal of the ear model unit, such as at the area of concha, or in the area of antitragus. The purpose of the rigid element is to cause vibrations of the elastomer part to thereby simulate bone-conduced sounds and enable electroacoustic testing. When the hearing device is placed onto or into the ear model unit, the occlusion effect may be analyzed.

The rigid element comprises means for connecting to the electrodynamic vibrator. As the ear model unit, or more precisely its elastomer part, is the part that vibrates, a connection to the electrodynamic vibrator may need to be established. The rigid element, connected to the elastomer part, may ensure a stable and durable connection with the electrodynamic vibrator to thereby ensure vibration of the ear model in accordance with signals sent from the electrodynamic vibrator. The rigid element may comprise a magnet enabling a connection to the electrodynamic vibrator. The means for connecting the rigid element to the electrodynamic vibrator may further include screws and/or grooves configured to connect to the electrodynamic vibrator or an extension of the vibrator, such as a vibrating rod.

The rigid element is configured to cause vibration of the elastomer part upon the rigid element being excited by the electrodynamic vibrator, meaning that once the electrodynamic vibrator connected to the rigid element generates a vibrational signal, the vibrational signal will be transferred to the rigid element which will in turn cause vibration of the elastomer part. By connecting the rigid element to the elastomer part, vibrations from the electrodynamic vibrator are transferred to the elastomer part. Vibrations excited in the elastomer may depend on the position and the size of the rigid element.

It is advantageous to provide the ear model unit which can be vibrated by an externally placed electroacoustic vibrator and which can be used for electroacoustic testing instead of providing an ear simulator. For the purpose of electroacoustic testing, it is sufficient to cause vibrations in the ear and ear canal, as vibrations exerted in the ear have the highest power flow and thereby provide most power transmission for acoustic sound. Also, vibrating only the ear portion significantly reduces power consumption and noise generation for electroacoustic testing as there is no need to vibrate an entire manikin. Also, it is possible to place an electroacoustic vibrator far from a testing manikin, thereby reducing noise and disturbance which the electroacoustic vibrator causes during testing. Furthermore, if the electroacoustic vibrator is placed close to or is in direct contact with the manikin, vibrations may cause damages to the manikin. Therefore, having an ear model unit configured to connect to an electroacoustic vibrator placed distantly from the ear module and from the entire head simulator is advantageous as it decreases wear of the head simulator. Finally, the elastomer with the rigid element provides a uniform vibration of the ear model unit. This solution can be used in known Tx/Rx testing setups.

According to some embodiments, the rigid element is enclosed in the elastomer part. Namely, the rigid element may not be visible from the outside as it may be completely enveloped by the elastomer part. Enclosing the rigid element in the elastomer part results in the best vibration transfer from the vibrator to the ear model. Alternatively, the rigid element may be pressed onto the elastomer part. By enclosing the rigid element into or pressing it onto the elastomer part, vibration transfer is improved.

According to some embodiments, the rigid element comprises plastic. The rigid element may also be fully made of a plastic material. The plastic material used for the rigid element may also be stiff and have a high strength so it does not bend and break when exposed to vibrations. Plastics such as Poly Ethylene, Poly Propylene (PP), and/or Poly Ethylene Terephthalate (PET) may be used. Using plastics in making the rigid element contributes to simplicity of producing the ear model as plastics are easy to shape and mold. In embodiments with the rigid element being enclosed in the elastomer part, the ear model unit may be produced by molding the elastomer part around the rigid element made of plastics.

According to some embodiments, the rigid element comprises metal. The rigid element may also be entirely made of metal. Metal used for the rigid element may be shaped into a stiff and a high strength piece so it does not bend and/or break when exposed to vibrations. Metals such as iron, titanium, tungsten, etc. may be used. Metal alloys such as steel, Inconel, etc. may as well be used for the rigid element. Using metals and their alloys in making the rigid element contributes to rigidity of the rigid element and ensures good transfer of vibrations from the electrodynamic vibrator to the ear model, i.e. the elastomer part. A metal rigid element may easily be pressed onto or into the elastomer part. Thereby, an existing, off-the-shelf, ear dummy may be used for making the ear model in accordance with embodiments of the present invention.

According to some embodiments, the elastomer is a rubber material. The rubber material has elasticity and softness which closely mimics a real human ear. It is an advantage to have the ear model unit made predominately of the rubber material as it is possible to get an off-the-shelf dummy made of rubber and modify it with the rigid element to thereby obtain the ear model unit according to embodiments of the present invention.

According to some embodiments, the ear model unit defines an ear canal. At least a portion of the rigid element may be arranged proximal to the ear canal of the ear model unit. In general, placement of the rigid element may depend on the purpose of the electroacoustic testing. Also, vibrations exerted proximal to the ear canal most closely mimic vibrations which occur in a human ear. Placing the rigid element proximal to the ear canal of the ear model unit, such as in the area of concha and antitragus, may result in less energy being required to excite sufficient vibration amplitude of the ear model compared to an implementation in which the rigid element is arranged in, e.g., helix or lobule of the ear model unit. Positioning the rigid element in the ear canal of the ear model unit may be favorable for testing in-the-ear hearing devices.

According to some embodiments, the rigid element forms an at least partly flat plate. The at least partly flat plate may be arranged proximal to the ear canal, such as in the area of concha and antitragus. The rigid element may as well be a flat plate. The flat plate is easy to manufacture and, if needed, arrange in an off-the-shelf ear dummy. The at least partly flat plate may occupy least space in the elastomer part.

According to some embodiments, at least a part of the rigid element forms a curved plate. When the rigid element is at least partly curved then it can follow curvatures of the elastomer part and in that way provide better transfer of vibrations from the electroacoustic vibrator to the elastomer part.

According to some embodiments, at least a part of the rigid element forms a portion of a hollow cylinder. The rigid element embodied as the portion of the hollow cylinder may be placed in the ear canal section of the ear model unit and generally follow the shape of the ear canal. The rigid element may have a shape of a half-cylinder, or a quarter of a cylinder, or three quarters of a cylinder. The cylinder may be around 10 mm tall. The cylinder section may be arranged in the ear canal by cutting out a portion of the elastomer part in the ear canal and making space for the cylinder section. This embodiment is preferred for tests in which the occlusion effect is observed and simulated.

According to some embodiments, the rigid element is arranged in the ear canal of the ear model unit. The rigid element may be pressed onto the ear canal of the elastomer part. By placing the rigid element in the ear canal of the ear model unit, the amplitude and spectrum of vibrations at the ear model unit arranged on a manikin resemble the amplitude and spectrum of vibrations at a human ear in response to a predetermined acoustic signal uttered through the mouth of the human. This means that when the rigid element placed in the ear canal is vibrated, sound is induced in the ear canal. When a hearing device under test is inserted in the ear canal, the hearing device will also be vibrated as it is the case in reality when the human speaks.

According to some embodiments, the ear model unit is configured to be detachably arranged on a manikin. This allows for a use of either a custom made ear model unit, or an off-the-shelf ear dummy, or an ear which forms part of the manikin and which is modified by insertion of the rigid element. The ear model unit may comprise means for attaching to the manikin.

According to a second aspect, an apparatus comprising a manikin, an electrodynamic vibrator, and a vibrating rod is provided. The manikin comprises an ear model unit as described above in connection to the first aspect. The ear model unit is configured to connect to the electrodynamic vibrator via the vibrating rod. The vibrating rod may be connected to the rigid element of the ear model unit. The electrodynamic vibrator may then induce vibration of the ear model unit to thereby simulate bone-conducted and/or air-conducted sounds conducted through the ear model.

The connection between the ear model unit and the electrodynamic vibrator may be established via a vibrating rod having, e.g., a permanent magnet at one end connected to the rigid element of the ear model unit comprising means for attaching it to the rod, such as a metal portion. This enables attaching and detaching the electrodynamic vibrator to and from the ear model unit without the use of tools and/or without requiring mechanical fixation. The vibrating rod and the ear model unit, i.e. the rigid element, may be arranged to magnetically attract each other at least when the vibrating rod is arranged in proximity of the ear model unit about to engage with the ear model unit for transferring vibrations. Thereby, a secure and stable connection capable of transferring vibrations can be conveniently established. Alternatively, the vibrating rod may be attached to the rigid element by glue. The vibrating rod may comprise extensions and resilient portions to thereby accommodate for a range of different positions of the electrodynamic vibrator with respect to the manikin.

An advantage of such an apparatus is that it can be used to perform more realistic electroacoustic tests on devices such as headsets, headphones, earphones, hearing instruments and active hearing protectors. The apparatus enables a simple simulation of sound propagation in the ear portion by deliberately inducing vibration of the ear model unit. In particular, the induced vibration may mimic so-called bone-conducted sounds. Bone-conducted sound is the perception of sound transmitted in the skull bones and surrounding tissues. Bone-conducted sound produces an auditory sensation when vibrations stimulate the inner ear via mechanisms different from ordinary air conduction transmission through the ear canal and middle ear. By inducing vibrations in the ear model unit, bone-conducted sound is simulated and an electroacoustic testing can then be performed on a hearing device.

According to a third aspect there is provided a method for performing electroacoustic testing of a hearing device comprising: at a system including an ear model unit in accordance with any of the embodiments of the first aspect, the hearing device arranged at the ear model unit and comprising an input transducer, a manikin, an electrodynamic vibrator, and a skull microphone located at the ear portion of the manikin:

generating a first test signal, the first test signal being input to the electrodynamic vibrator, causing the electrodynamic vibrator to induce vibration at the ear model unit and thereby generate a sound in the ear canal of the ear model unit; and acquiring a measurement signal, the measurement signal being based on the sound generated in the ear canal of the ear model unit and received by the input transducer and/or by the skull microphone.

The hearing device under test may include headsets, headphones, earphones, hearing instruments, hearing protectors, and in particular on-ear hearing devices, and in-the-ear hearing devices. The input transducer of the hearing device under test may include a vibrational sensor, a microphone, or similar. The hearing device under test may be arranged in the ear model unit of the manikin, or at the ear model unit of the manikin, or on the ear model unit of the manikin. The hearing device may include a resilient member to keep it fixated in the ear canal or it may include a cushion and a headband or fixating the hearing device on the ear of the manikin. In some examples, the hearing device is a device serving as a reference for acquiring a signal for determining calibration values.

The hearing device, i.e. its input transducer, may pick up the induced vibrations generated upon excitation of the ear model unit by the electrodynamic vibrator, said induced vibrations mimicking bone-conducted sound. The input transducer may be a microphone or a bone conduction sensor, or it may include more than one microphone and/or more than one sensor. The input transducer may be used for estimation of the bone-conduction effect induced in the ear.

The skull microphone is located at the ear portion of the manikin. It may be arranged at an inner side of the manikin and allow the hearing device under test to be arranged in the ear canal or at the ear model unit or on the ear model unit. The skull microphone may be a vibrational pick-up microphone, e.g. including an accelerometer. The skull microphone may be used for analyzing the occlusion effect. When the ear is occluded, sound energy that would typically escape from the ear is trapped in the ear when the hearing device is inserted in the ear canal. This trapped sound energy is reflected back towards the inner ear. This increases intensity of the sound in the ear resulting in the appearance of a more sensitive threshold. The skull microphone may pick up the sound energy trapped in the inner ear. The skull microphone may also pick up the induced vibration mimicking bone-conducted sound.

Signals obtained by the input transducer and/or the skull microphone are then processed and analyzed. Based on the analysis it can be determined how the hearing device under test influences or whether it causes the occlusion effect. It can also be determined how to possibly adapt the hearing device and/or signal processing in the hearing device to thereby influence the occlusion effect. By adapting the hearing device and/or its signal processing, active occlusion activation and/or passive occlusion cancellation can be achieved.

When the measurement signal is only based on the sound generated in the ear canal of the ear model unit and received by the skull microphone, calibration of the system with the manikin may be performed.

The first test signal is typically generated by a signal generator manipulated by an operator performing the electrodynamic test. The first test signal may cover a range of frequencies between 100 Hz and 20 kHz, such as 10 kHz, and such as 15 kHz. Typically, the first test signal causes vibrations of around 18 kHz. The first test signal may be an alternating current (AC) signal. Alternatively, the first test signal may be a direct current (DC) signal to which at least a frequency modulation is applied. The first test signal in the form of the alternating current may be caused by applying an electric signal including a voice signal. The first signal may include a sweep from a first frequency to a second frequency, e.g. a so-called chirp. The first frequency may be about 50-200 Hz, e.g. about 100 Hz. The second frequency may be about 1-4 kHz, e.g. about 1.5 kHz.

The first test signal is input to the electrodynamic vibrator. The first test signal may be generated by an AC signal generator. Alternatively, the electrodynamic vibrator may include a coil driven by an alternating current (AC). The first test signal may include a frequency sweep, chirp, etc.

The electrodynamic vibrator generates vibrations which are then transferred, via the vibrating rod, to the rigid element of the ear model unit which in turn induces vibration in the ear model unit. The induced vibration may mimic bone-conducted sounds known from a human's head. Therefore, during the testing, the bone-conducted sound is induced in the manikin.

Since the hearing device is arranged in the ear model unit, the input transducer can capture the vibrations induced at the ear model unit. Alternatively or additionally, the measurement signal can be captured by the skull microphone arranged at the ear portion of the manikin. The measurement signal is therefore based on the sound generated in the ear canal of the ear model unit and received by the input transducer and/or by the skull microphone. The measurement signal can be processed, and thereby the occlusion effect and bone-conduction can be analyzed, and in particular the influence of the hearing device under test on the occlusion and bone-conduction.

Electroacoustic testing of the hearing device under test may include computing a characteristic based on at least the measurement signal. The method enables a power efficient simulation of sound propagation from a human's mouth to the ear portion by deliberately inducing vibration of the ear model unit.

It is advantageous to be able to analyze how occlusion and bone-conduction influence operation of the hearing device under test. Based on the analysis, the hearing device and/or its signal processing can be adapted to improve a user's experience in connection with the occlusion effect. Also it can be analyzed how the size, shape and level of insertion of the hearing device influence the occlusion effect.

According to some embodiments, the method further comprises generating a second signal, wherein the second signal is input to a mouth simulator of the manikin, causing the mouth simulator to emit an acoustic voice signal. The measurement signal may further be based on the acoustic voice signal received by the input transducer and/or by the skull microphone. The acoustic voice signal may result in air-conducted sound and/or bone-conducted sound. The input transducer and/or the skull microphone receive the acoustic signal after it has been propagated through the ear model unit upon excitation of the mouth simulator.

According to some embodiments, the method further comprises generating a third signal, the third signal being generated by the hearing device into the ear model unit, and wherein the measurement signal is further based on the third signal as received by the input transducer and/or by the skull microphone. By generating the third signal by the hearing device, the occlusion effect may further be analyzed, and based on the analysis further reduction of the occlusion may be achieved.

Effects and features of the second and third aspects are to a large extent analogous to those described above in connection with the first aspect. Embodiments mentioned in relation to the first aspect are largely compatible with the second and third aspects.

The present invention relates to different aspects including the ear model unit, the apparatus comprising a manikin with the ear model unit, and the method for performing electroacoustic testing described above and in the following, and corresponding device parts, each yielding one or more of the benefits and advantages described in connection with the first mentioned aspect, and each having one or more embodiments corresponding to the embodiments described in connection with the first mentioned aspect and/or disclosed in the appended claims.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present disclosure, will become readily apparent to those skilled in the art by the following illustrative and non-limiting detailed description of example embodiments of the present disclosure, when taken in conjunction with the accompanying drawings.

FIG. 1 schematically illustrates an exemplary embodiment of an ear model unit according to an embodiment of the present disclosure.

Figure 2:
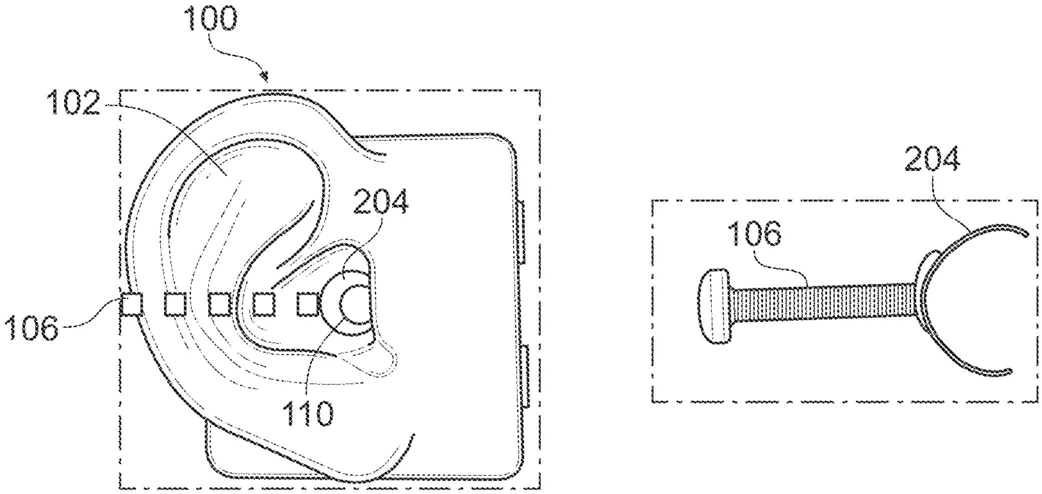
Figure 2:
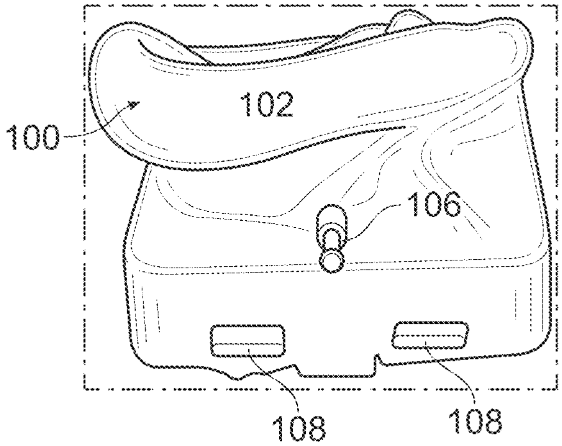

FIG. 2 schematically illustrates another exemplary embodiment of an ear model unit according to an embodiment of the present disclosure.

Figure 3:
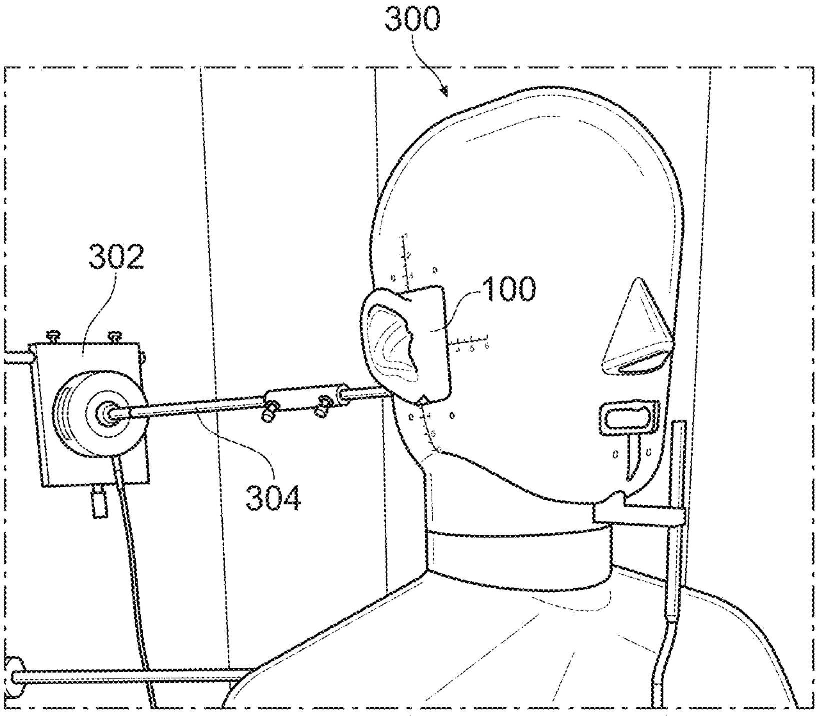
Figure 3:
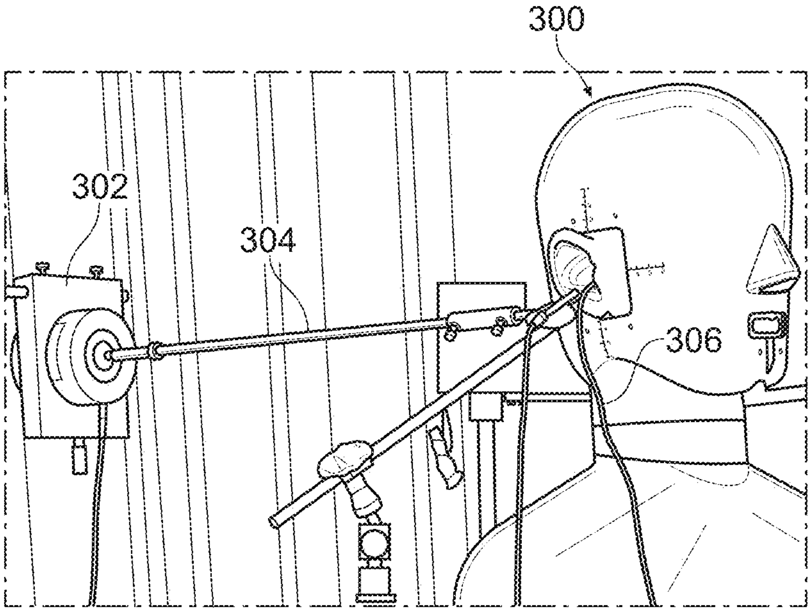

FIG. 3 schematically illustrates an apparatus for electroacoustic testing according to an embodiment of the present disclosure.

DETAILED DESCRIPTION

Various embodiments are described hereinafter with reference to the accompanying drawings.

Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 schematically illustrates an exemplary embodiment of an ear model unit 100 according to an embodiment of the present disclosure. FIG. 1*a*) shows a front view of the ear model unit 100 for electroacoustic testing. The ear model unit 100 is configured to be connected to an electrodynamic vibrator. The ear model unit 100 comprises an elastomer part 102 formed from an elastomer. The ear model unit 100 further comprises a rigid element 104 connected to the elastomer part 102. The rigid element 104 comprises means 106 for connecting to the electrodynamic vibrator. The rigid element 104 is configured to cause vibration of the elastomer part 102 upon the rigid element 104 being excited by the electrodynamic vibrator. FIG. 1*a* shows the rigid element 104 in dashed lines indicating that the rigid element is enclosed in the elastomer part 102 and thus not visible from the outside. The means 106 may also be enclosed in the elastomer part 102 and thereby also not visible from the outside. In the insert of FIG. 1*a*) the rigid element 104 connected with the means 106 for connecting the rigid element to the electrodynamic vibrator is shown. The means 106 may be in the form of a metal screw soldered to the rigid element 104 being in the form of a metal plate. FIG. 1*b*) shows a rear view of the ear model unit 100 where the means 106 for connecting the rigid element 104 to the electrodynamic vibrator are clearly visible. FIG. 1*b*) also shows means 108 for attaching the ear model unit 100 to a manikin. Therefore, the ear model unit 100 may be configured to be detachably arranged on the manikin. In this embodiment, the rigid element 104 is enclosed in the elastomer part 102. The rigid element 104 may comprise plastic, or metal, or another material which can provide sufficient rigidity to the rigid element 104. The elastomer part 102 may be formed from a rubber material. In this embodiment, the rigid element 104 may form an at least partly flat plate or it may form an at least partly curved plate. The ear model unit 100 may define an ear canal 110 and at least a portion of the rigid element 104 is arranged proximal to the ear canal 110 of the ear model unit 100. The rigid element and the means 106 for connecting the ear model unit 100 to the electrodynamic vibrator may as well be pressed onto the elastomer part 102. FIG. 1*c*) shows how the ear model unit 100, comprising the rigid element 104 and the means 106 for connecting to the electrodynamic vibrator 302, connects to the vibrator 302 via the vibrating rod 304. The means 106 for connecting to the electrodynamic vibrator may be soldered to the rigid element. The means 106 may comprise a magnet which may be connected to the vibrating rod 304. The vibrating rod 304 is then connected to the electrodynamic vibrator 302.

FIG. 2 schematically illustrates another exemplary embodiment of an ear model unit 100 according to an embodiment of the present disclosure. FIG. 2*a*) shows a front view and FIG. 2*b*) shows a rear view of the ear model unit 100. The ear model unit 100 may define an ear canal 110 and the rigid element 204 is arranged in the ear canal 110 of the ear model unit 100. In this embodiment, the rigid element 204 forms a portion of a hollow cylinder which is pressed onto the elastomer part 102. The rigid element is connected to the means 106 which enable connection of the rigid element with the electrodynamic vibrator via the vibrating rod. The means 106 shown in dashed line may be enclosed in the elastomer part and therefore may not be visible from the outside. In the insert of FIG. 2*a*) the rigid element 204 connected with the means 106 for connecting the rigid element to the electrodynamic vibrator is shown. The means 106 may be in the form of a metal screw soldered to the rigid element 204 being in the form of a section of a hollow cylinder. FIG. 2*b*) shows the means 106 for connecting the rigid element 204 to the electrodynamic vibrator as well as means 108 for attaching the ear model unit 100 to a manikin.

FIG. 3 schematically illustrates an apparatus for electroacoustic testing according to an embodiment of the present disclosure. FIG. 3*a*) shows an apparatus comprising a manikin 300, an electrodynamic vibrator 302, and a vibrating rod 304. The manikin 300 comprises the ear model unit 100 shown in either FIG. 1 or FIG. 2. The ear model unit 100 is configured to connect to the electrodynamic vibrator 302 via the vibrating rod 304.

The apparatus may be configured to perform electroacoustic testing of a hearing device. The apparatus including the ear model unit 100 allows for placing the electroacoustic vibrator 302 away from the manikin and away from the hearing device under test. As the electroacoustic vibrator 302 is placed away from the manikin, its operation will not disturb the testing of the hearing device. Also, wear of the manikin is reduced by such arrangement. Additionally, as the electroacoustic vibrator 302 is arranged to connect to the ear model unit 100 only, and thereby cause vibrations of the ear model unit only, power consumption and noise is reduced compared to solutions where the entire manikin 300 is vibrated. FIG. 3*b*) shows the apparatus of FIG. 3*a*) with the hearing device under test 306, in the form of a wired in-the-ear headphones. In this setup, the headphones 306 can be tested for, e.g., the occlusion effect Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES

100 ear model unit
102 elastomer part
104, 204 rigid element
106 means for connecting a rigid element to an electroacoustic vibrator
108 means for attaching an ear model unit to a manikin
110 ear canal
300 manikin
302 electroacoustic vibrator
304 vibrating rod
306 hearing device under test

The invention claimed is:

1. An ear model unit for electroacoustic testing,
the ear model unit being configured to be connected to an electrodynamic vibrator,
the ear model unit comprising an elastomer part formed from an elastomer, and
the ear model unit further comprising a rigid element connected to the elastomer part,
the rigid element comprising means for connecting to the electrodynamic vibrator, and
the rigid element being configured to cause vibration of the elastomer part upon the rigid element being excited by the electrodynamic vibrator.

2. The ear model unit according to claim 1, wherein the rigid element is enclosed in the elastomer part or pressed onto the elastomer part.

3. The ear model unit according to claim 1, wherein the rigid element comprises plastic.

4. The ear model unit according to claim 1, wherein the rigid element comprises metal.

5. The ear model unit according to claim 1, wherein the elastomer is a rubber material.

6. The ear model unit according to claim 1, wherein the ear model unit defines an ear canal, and wherein at least a portion of the rigid element is arranged proximal to the ear canal of the ear model unit.

7. The ear model unit according to claim 1, wherein the rigid element forms an at least partly flat plate.

8. The ear model unit according to claim 1, wherein at least a part of the rigid element forms a curved plate.

9. The ear model unit according to claim 1, wherein at least a part of the rigid element forms a portion of a hollow cylinder.

10. The ear model unit according to claim 9, wherein the rigid element is arranged in the ear canal of the ear model unit.

11. The ear model unit according to claim 1, wherein the ear model unit is configured to be detachably arranged on a manikin.

12. An apparatus comprising a manikin, an electrodynamic vibrator, and a vibrating rod, the manikin comprising an ear model unit according to claim 1, the ear model unit being configured to connect to the electrodynamic vibrator via the vibrating rod.

13. A method for performing electroacoustic testing of a hearing device comprising:

at a system including an ear model unit in accordance with claim 1, the hearing device arranged at the ear model unit and comprising an input transducer, a manikin, an electrodynamic vibrator, and a skull microphone located at the ear portion of the manikin:

generating a first test signal, the first test signal being input to the electrodynamic vibrator, causing the electrodynamic vibrator to induce vibration at the ear model unit and thereby generate a sound in the ear canal of the ear model unit; and acquiring a measurement signal, the measurement signal being based on the sound generated in the ear canal of the ear model unit and received by the input transducer and/or by the skull microphone.

14. The method according to claim 13, the method further comprising generating a second signal, wherein the second signal is input to a mouth simulator of the manikin, causing the mouth simulator to emit an acoustic voice signal, and wherein the measurement signal is further based on the acoustic voice signal received by the input transducer and/or by the skull microphone.

15. The method according to claim 13, the method further comprising generating a third signal, the third signal being generated by the hearing device into the ear model unit, and wherein the measurement signal is further based on the third signal as received by the input transducer and/or by the skull microphone.

* * * * *